(12) United States Patent
Boler et al.

(10) Patent No.: US 7,239,328 B2
(45) Date of Patent: Jul. 3, 2007

(54) LOSSLESS MANIPULATION OF MEDIA OBJECTS

(75) Inventors: Sabrina D. Boler, Seattle, WA (US);
Karen L. Baker, Redmond, WA (US);
Robert E. Gruhl, Seattle, WA (US);
Robert D. Young, Bellevue, WA (US);
Thomas W. Getzinger, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/405,380

(22) Filed: Apr. 17, 2006

(65) Prior Publication Data

US 2006/0187241 A1 Aug. 24, 2006

Related U.S. Application Data

(63) Continuation of application No. 10/066,167, filed on Jan. 31, 2002.

(51) Int. Cl.
*G09G 5/00* (2006.01)
*G06F 7/00* (2006.01)
*G06K 9/36* (2006.01)
*G11B 27/00* (2006.01)
*G06K 9/32* (2006.01)

(52) U.S. Cl. ............... 345/619; 345/566; 382/282; 382/295; 707/1; 707/104; 715/723

(58) Field of Classification Search ............... 345/619, 345/649–650, 654, 566, 652, 547, 555; 715/500, 715/530, 700, 723, 732; 382/232, 282, 295–299, 382/254, 291, 293, 298, 305–306; 707/1, 707/103, 104, 527, 100; 375/150
See application file for complete search history.

(56) References Cited

U.S. PATENT DOCUMENTS

| 6,553,150 B1 | 4/2003 | Wee et al. ............... 382/243 |
| 6,742,082 B1 | 5/2004 | Lango et al. ............... 711/118 |
| 7,142,225 B1* | 11/2006 | Boler et al. ............... 345/619 |
| 2001/0054131 A1 | 12/2001 | Alvarez et al. ............... 711/105 |
| 2002/0032027 A1 | 3/2002 | Kirani et al. ............... 455/426 |
| 2002/0033844 A1 | 3/2002 | Levy et al. ............... 345/744 |
| 2002/0069218 A1* | 6/2002 | Sull et al. ............... 707/501.1 |
| 2002/0089519 A1 | 7/2002 | Betz et al. ............... 345/634 |
| 2003/0009469 A1 | 1/2003 | Platt et al. ............... 707/100 |
| 2003/0088573 A1* | 5/2003 | Stickler ............... 707/100 |
| 2003/0110503 A1 | 6/2003 | Perkes ............... 725/86 |
| 2003/0193994 A1* | 10/2003 | Stickler ............... 375/150 |
| 2004/0143604 A1 | 7/2004 | Glenner et al. ............... 707/200 |
| 2005/0076058 A1 | 4/2005 | Schwesig et al. ............... 707/104.1 |
| 2005/0203927 A1* | 9/2005 | Sull et al. ............... 707/100 |

OTHER PUBLICATIONS

Boliek, Martin, Ed. Dec. 7, 2000. JPEG 2000 Part II Final Committee Draft. Annex M "JPX file format extended metadata definition and syntax." *ISO/IEC FCD15444-2*: 227-233 and 262-266.
"iPhoto FAQ." in Apple Website: http://www.apple.com/iphoto/faq.html, 3 pp.

* cited by examiner

*Primary Examiner*—Wesner Sajous
(74) *Attorney, Agent, or Firm*—Workman Nydegger (57) ABSTRACT

An original media object, such as an image, is edited without loss of the data comprising the media object. Changes applied to the media object are defined by metadata associated with the media object. For example, metadata define the cropping of an original JPEG image without loss of the original image. The metadata from a previous editing session can be used to further revising a change to the media object. Preferably, the metadata are stored as a stream in a substorage of an object linking and embedding (OLE) file. For display purposes, and for ease of modification, an edited version of the media object is stored as another stream of data in the substorage of the OLE file. The edited version of the media object is preferably compressed and serves as an intermediate object for faster display during editing and as a surrogate if the original media object is unavailable.

19 Claims, 9 Drawing Sheets

LOSSLESS MANIPULATION OF MEDIA OBJECTS

RELATED APPLICATIONS

This application is a continuation of copending application Ser. No. 10/066,167, filed on Jan. 31, 2002, the benefit of the filing date of which is hereby claimed under 35 U.S.C. § 120.

FIELD OF THE INVENTION

The present invention generally relates to editing a digital media object, and more specifically, pertains to retaining data that define the digital media object prior to its modification by a user, while enabling the effect of such modification to be applied when the digital media object is displayed.

BACKGROUND OF THE INVENTION

The term "digital media object" is generic to several different kinds of data that can be rendered either aurally or visually. This term thus encompasses digital images, audio sounds, and video images, all of which are now commonly accessed on personal computers and other types of electronic devices. For example, digital cameras, scanners, and digital video cameras are widely used to create digital media objects of the visual variety, while *.wma and *.mp3 files are typical digital media objects of the audio type.

Software applications are also readily available to manipulate digital media objects. For instance, it is common for users to employ image editing software to modify digital images by cropping, rotating, and inverting, or by changing contrast, color, or sharpness of an image. However, if a user applies an editing change to the original image, and then closes the editing application after saving the modified image to the original file name/location, it will normally not be possible for the user to again open the original image. Accordingly, most users have learned to save any modified image to a new file, retaining separate files for the modified and original images. Because image files can be relatively large, saving multiple modified versions of an image often requires substantial additional storage space on a user's hard drive or other storage media. Also, for certain editing changes such as cropping of an image, if the user wishes to change the amount of the modification, e.g., reduce the amount of the original image that was cropping that was applied, the user must start over with the original image to regain any portion of the image that was trimmed from the original image in the earlier editing. The user must also start over if default settings were applied in a previous editing session, such as application of a default cropping rectangle.

Some software applications, such as Adobe Corporation's Photoshop™ keep a history of modifications made to a media object, and allow the user to undo most of the modifications made during an editing session. However, once the changes are saved to an original file, and the current editing session is closed, the option to undo an editing modification is lost.

Also, the Joint Photographic Experts Group (JPEG) 2000 standard provides history metadata to provide partial information about how a picture was modified to achieve its current state. However, the JPEG 2000 standard specifically states that the history metadata is not designed to be used to reverse (undo) image editing operations. Nor does the JPEG 2000 standard enable subsequent further changes to an editing modification based on the previous editing operations. Instead, the JPEG history metadata simply provides a list of editing operations that were performed on the picture. (See Sections M.5.3 & M.6.3 of Annex M to JPEG 2000 Part II Final Committee Draft, Dec. 7, 2000, Joint Photographic Experts Group, available at http://www jpeg.org/public/fcd15444-2.pdf).

It would be desirable to minimize the number of versions of a modified media object that must be saved, while enabling a user to retain the original image data and to modify the changes previously made, and it would be desirable to enable the user to retain the highest quality media object after changes have been made. It would also be desirable to enable a user to be able to observe the modification previously made and to revise those modifications without starting over with an original image.

SUMMARY OF THE INVENTION

The present invention is directed to a method for lossless modification of an original media object, such as a static image, a video image, or a sound. The term "lossless editing" is sometimes used in the art to refer to schemes that enable a user to decompress an image saved in a lossy format, edit the image, and then save the image without incurring further losses due to recompressing the image with the lossy compression technique. However, the present invention is directed to an entirely different purpose. In the present invention, the term "lossless" refers to modifying a representation of a media object without losing or changing data that define the media object. Data defining the media object are accessed and employed to produce a representation of the media object that can be edited by performing a modification such as cropping, rotating, and/or trimming. For example, if the data defining the media object defines a static image, the representation will be the display of the image. However, the data defining the media object are not modified, and there is no need to save separate data in a file for each modification performed on the representation of the media object. Instead, each modification of the object is defined by metadata. The metadata are modified when the media object is subsequently modified. While it is contemplated that different versions of the metadata can be saved to represent different modifications, rather than saving different versions of the media object, it is preferable to simply save the metadata with the data for the media object. Updating the metadata rather than the media object reduces the amount of storage space required and enables a modification to be applied to the best quality data available, i.e., to the data for the original media object.

For example, an original JPEG image may be cropped multiple times without saving multiple cropped images. For each successive change in the cropping of the image, it is not necessary for the user to start over with the original image to achieve the desired cropping. Instead, since the metadata defines the previous cropped image size and shape on a representation of the original image, any changes in the size and shape of the cropping can be accomplished by simply modifying the cropped portion and updating the metadata that defines the cropped image size and shape. The portion of the original image that is outside the limits of the cropped image is made to appear visually different than the portion of the image that is inside the limits to provide the user with a clear indication of how the cropped image relates to the extent and shape of the original image. Yet, while the cropped image can be saved separately, the data for the original image are not "cropped" or otherwise changed by this modification. Only the metadata that define the cropped image are modified each time a user changes a previous modification.

Preferably, the metadata are stored as a stream of data in a substorage of an object linking and embedding (OLE) file. For display purposes, for ease of modification, and for saving to a low-capacity medium, the modified version of the media object can be stored as another stream of data in the substorage of the OLE file. The modified version of the media object is preferably saved in a compressed format, e.g., as a JPEG file. The compressed file serves as an intermediate object for faster display, for storing on a low-capacity medium, for network transmission (e.g., email), and as a surrogate in case the data for the original media object are unavailable. If the data for the original media object again become available, subsequent modifications can be based on the original. For example, an intermediate cropped image can be modified by changing the cropping, and the metadata that define the new cropped image updated even though the data for the original image are not available. If the data for original image again become available, the cropped image can be losslessly saved, based on the current metadata and the data for the original image, so that no resolution is lost from the portion of the original image included in the cropped image.

Another aspect of the present invention is directed to a machine-readable medium having machine instructions for generally performing the functions described above. Yet another aspect of the present invention is directed to a system that carries out functions generally consistent with the steps of the above-described method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
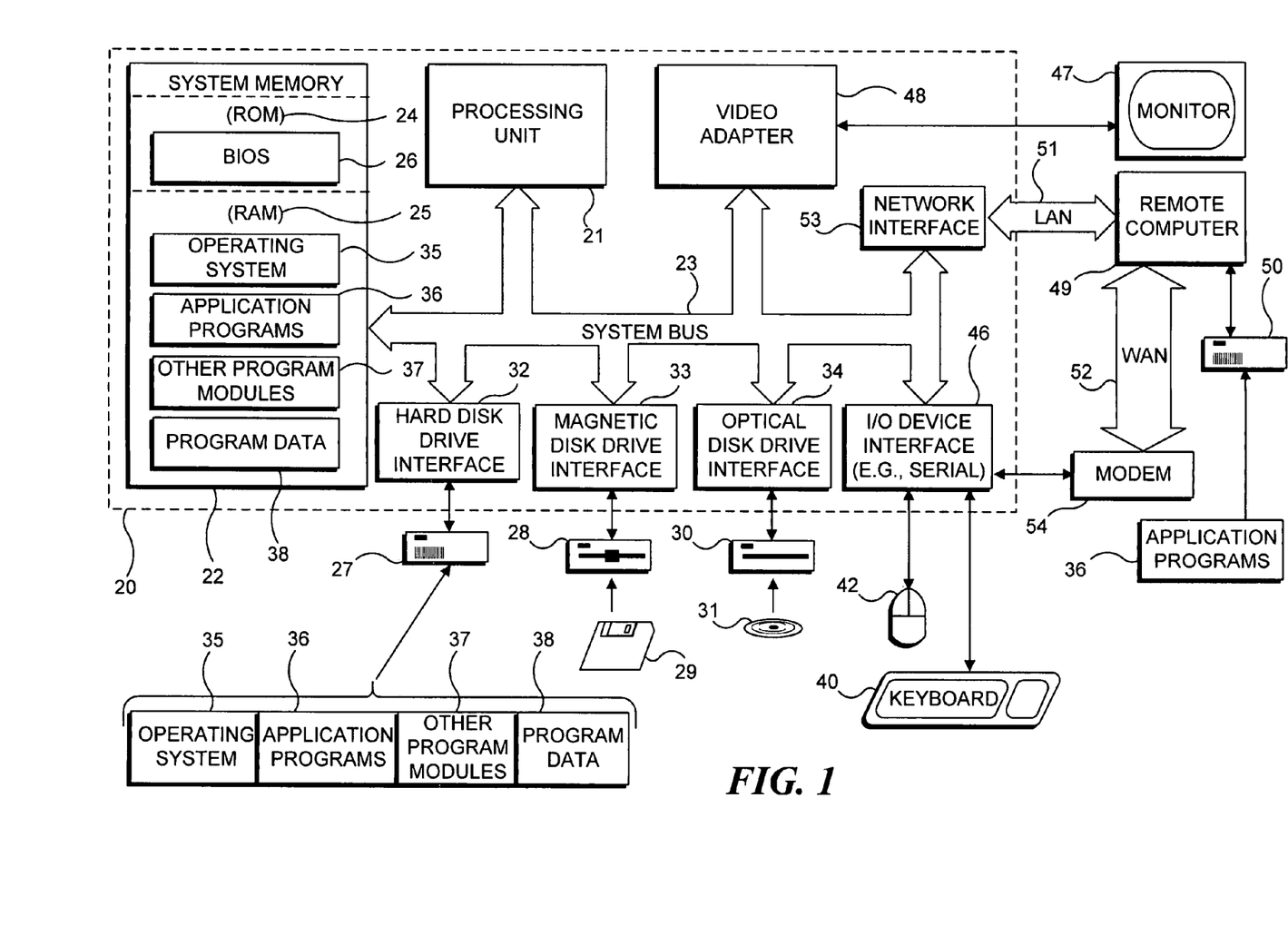
FIG. 1 is a block diagram of an exemplary system for implementing the present invention, using a general purpose computing device in the form of a conventional personal computer (PC)

FIG. 1 and the following discussion are intended to provide a brief, general description of a suitable computing environment in which the present invention may be implemented. The invention may be practiced on a single computing device, but can also be practiced on a client computing device coupled in communication with a server or other remote computing device over a communication network. Both the client computing device and the server will typically each include the functional components shown in FIG. 1. Although not required, the present invention will be described in the general context of computer executable instructions, such as program modules that are executed by a PC. Generally, program modules include application programs, routines, objects, components, functions, data structures, etc. that perform particular tasks or implement particular abstract data types. Also, those skilled in the art will appreciate that this invention may be practiced with other computer system configurations, particularly in regard to a client device for executing personal productivity tools, including hand-held devices, pocket personal computing devices, digital cell phones adapted to execute application programs and to wirelessly connect to a network, other microprocessor-based or programmable consumer electronic devices, multiprocessor systems, network PCs, minicomputers, mainframe computers, and the like. The present invention may also be practiced in distributed computing environments, where tasks are performed by remote processing devices that are linked through a communications network. In a distributed computing environment, program modules may be located in either or both local and remote memory storage devices.

With reference to FIG. 1, an exemplary system for implementing the present invention includes a general purpose computing device in the form of a conventional PC 20, which is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disk 29, and removable optical disk 31, it will be appreciated by those skilled in the art that other types of computer readable media, which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a microphone, joystick, game pad, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, and/or other information. In addition to the monitor, PCs are often coupled to other peripheral output devices (not shown), such as speakers (through a sound card or other audio interface—not shown) and printers.

As indicated above, the invention may be practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

EXEMPLARY EMBODIMENT

Figure 2:
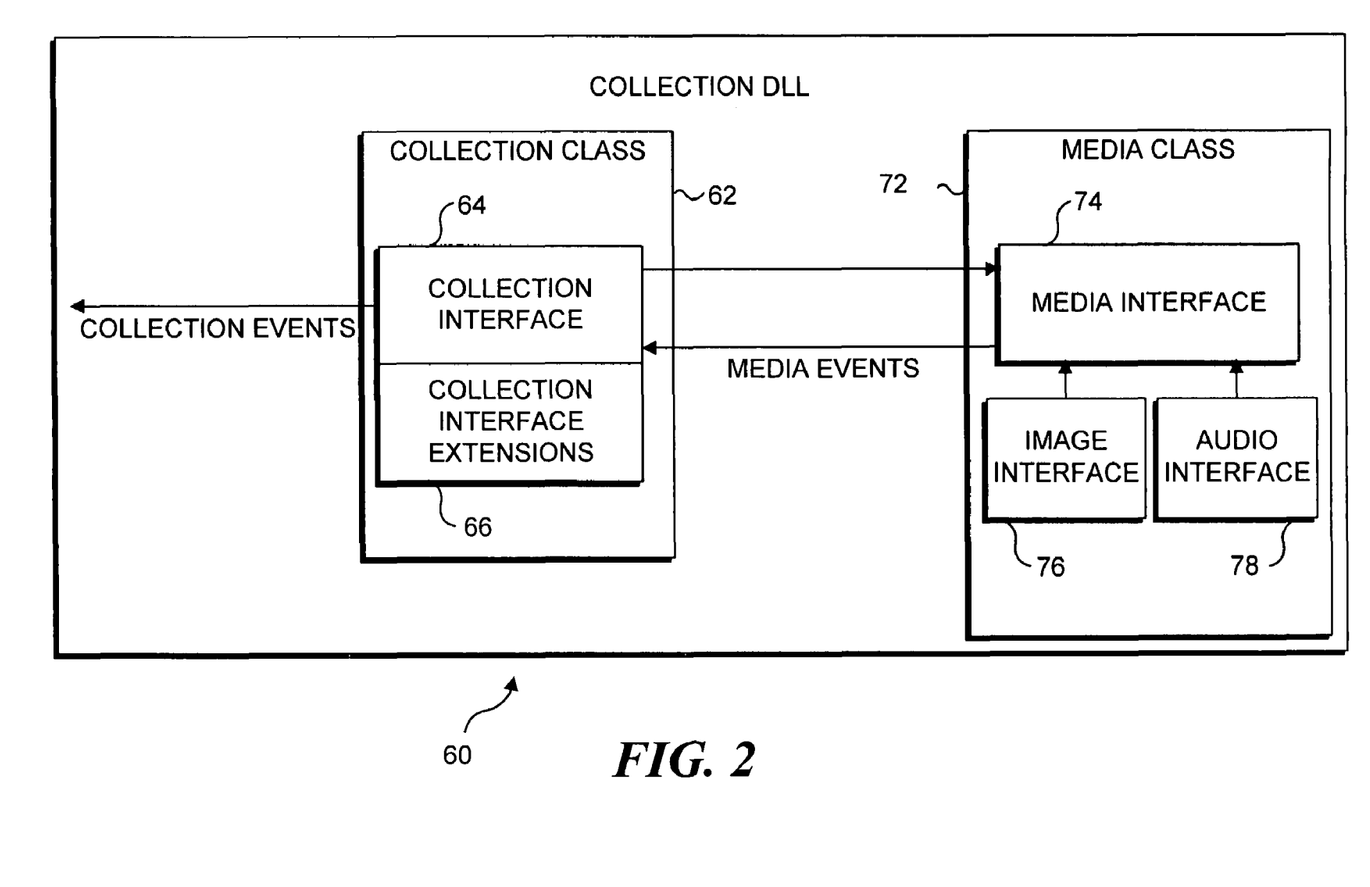
FIG. 2 is a block diagram illustrating an overall architecture of a preferred embodiment of software modules for implementing the present invention.

FIG. 2 is a block diagram illustrating an overall architecture of one preferred embodiment. A collection dynamic link library (DLL) 60 includes a collection class 62 and a media class 72. Each class includes interfaces used to manage individual media objects and collections of media objects. Specifically, collection class 62 includes a collection interface 64 that manages collections of media objects. Collection interface 64 is automation compliant and can be used by automation languages such as Jscript, Visual Basic, or from C++. A collection of media objects is preferably stored in an object linking and embedding (OLE) document file. This structured file stores streams of data for each media object of the collection in a substorage. Collection interface 64 thus accesses and manages data relevant to an entire collection of media objects. For example, collection interface 64 provides methods to add a media object, remove a media object, reorder the media objects, and perform other operations to manage the collection. Collection interface 64 also provides methods for managing metadata associated with an entire collection. For example, collection interface 64 provides methods for adding a title to the collection, specifying a numbering style, and other data relevant to the entire collection. Table 1 illustrates metadata relevant to an entire collection of image media objects.

TABLE 1

Metadata Streams for an Entire Collection of Image Media Objects

| Name | Data Format | Description |
| --- | --- | --- |
| NumMedia | long | This contains the number of media objects in the collection. |
| Title | WSTR | This optional stream contains the collection title. |
| NumberingStyle | long | This optional stream contains the numbering style. It has a value from the enum type NumberingStyles, which is found in Collection.idl. |
| SlideShowSpeed | long | This optional stream contains the slide show speed, in seconds. |
| CoverSheetStyle | long | This optional stream contains the cover sheet style. It has a value from the enum type CoverSheetStyles, which is found in Collection.idl. |
| AllowCaptions | long | This optional stream indicates if captions should be allowed. By default, captions are allowed on pictures. If this stream is FALSE (0), all picture captions are ignored. |

Collection interface 64 may also be expanded with collection interface extensions 66. For example, collection interface extension 66 may include methods for creating versions of a collection that may be electronically mailed as attachments to email.

Media class 72 includes analogous interfaces. Specifically, media class 72 includes a media interface 74 that contains methods, properties, and events that can apply to multiple types of media objects. In connection with the present invention, an image interface 76 implements methods and applies properties for managing image objects. Similarly, an audio interface 78 implements methods and applies properties for managing audio objects. As indicated above, each media object in the collection is preferably stored in a substorage of an OLE document file. The substorage includes a stream of data that defines the media object. For example, an image may be stored as a JPEG stream. The substorage also includes streams for metadata relevant to an individual media object. For example, the substorage for an image may include metadata defining a height, width, caption, source file location, and other parameters relevant to the image. More importantly, the substorage includes metadata associated with modifications that have been made to the media object. For example, the substorage may include metadata defining a crop outline that indicates the size and position of a cropped image to define how an image was selectively cropped by a user.

As is customary, the interfaces of collection DLL 60 may provide events, such as media events and collection events, that trigger other objects to perform an operation. For example, media interface 74 may provide a modify event causing collection interface 64 to update metadata for the collection. Similarly, collection interface 64 may provide a modify event causing another object inside or outside collection DLL 60 to perform some operation related to the collection.

Figure 3:
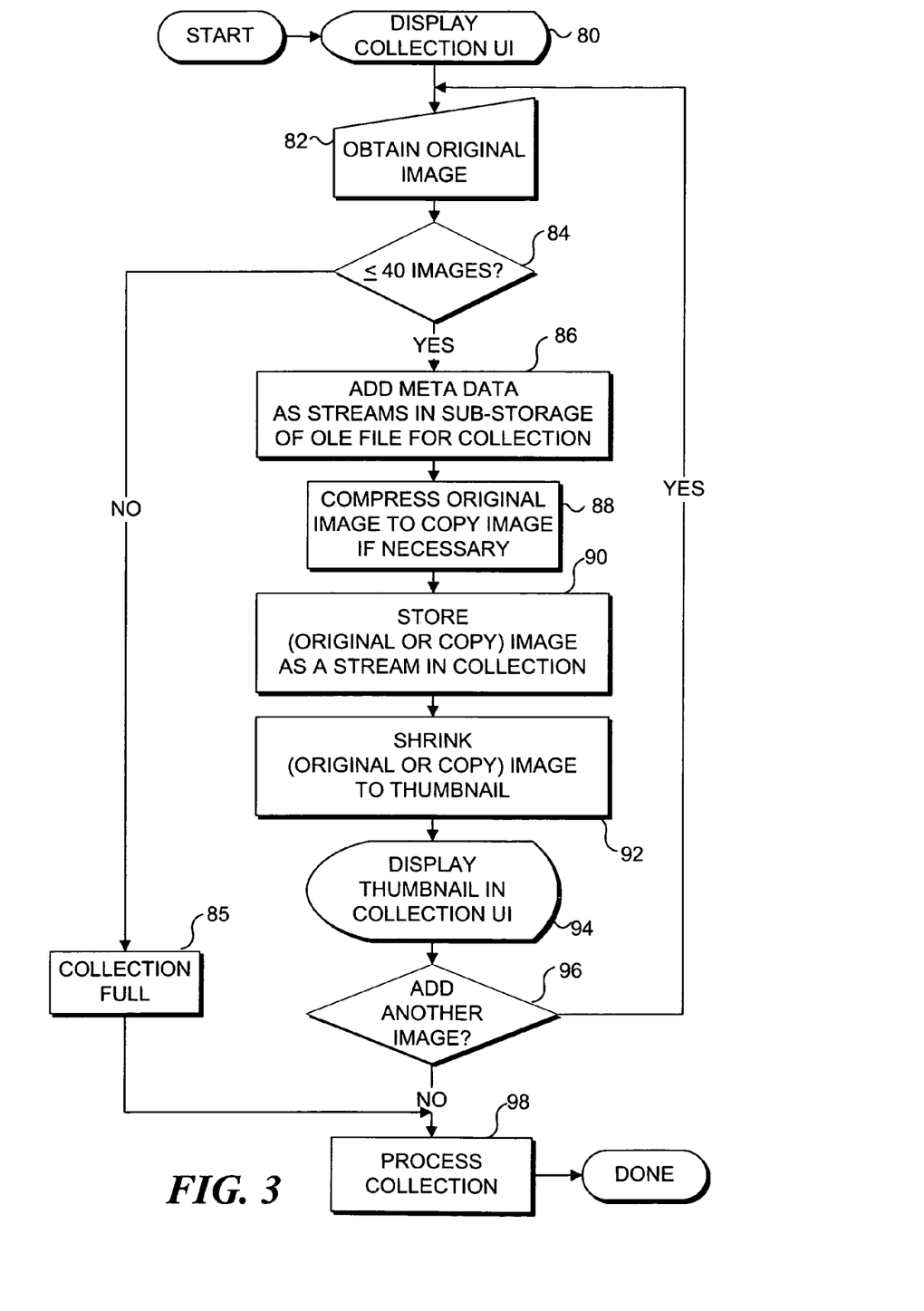
FIG. 3 is a flow chart illustrating logic for a photo viewer software application embodiment employed to populate a collection with images.

FIG. 3 is a flow chart illustrating logic for a photo viewer software application that populates a collection with images. At a step 80, the photo viewer displays a collection user interface. A user can then obtain an original image at a step 82, either from an image file, by using a scanner, from a digital camera, or from some other source. At a decision step 84, the photo viewer determines whether the collection contains 40 or less images. Although there is no reason for limiting a collection to any specific number of images, it is generally preferable to limit a collection to sufficiently few images to ensure that the collection can be stored on a conventional 1.44 megabyte floppy disk. If the collection already contains 40 images, the photo viewer prevents the user from adding another image to the collection and/or notifies the user that the collection is full, at a step 85.

If the collection is not full, however, the photo viewer adds the stream of metadata related to the image to a substorage of an OLE document file for the collection, at a step 86. Table 2 illustrates preferred metadata included in a substorage for an image media object.

TABLE 2

Metadata Streams for An Image Media Object

| Name | Data Format | Description |
| --- | --- | --- |
| CaptioningStyle | long | This optional stream contains the media object's captioning style. It has a value from the enum type CaptioningStyles, which is found in Collection.idl. |
| Width | long | This stream contains the width of the media object's original image, in pixels. |
| Height | long | This stream contains the height of the media object's original image, in pixels. |
| Rotation | long | This stream contains the rotation that should be applied to the image, in degrees. It must be a multiple of 90. |
| CropRect (i.e., crop outline) | RECT | This stream contains the cropping rectangle that should be applied to the image after rotation, in order to create the display image. |
| CopyWidth | long | This stream contains the width of the media object's copy image, in pixels. The copy image is the one saved in the collection file (see Jpeg stream below). |
| CopyHeight | long | This stream contains the height of the media object's copy image, in pixels. The copy image is the one saved in the collection file (see Jpeg stream below). |
| CopyCropRect | RECT | This stream contains the cropping rectangle, indicating what portion of the media object's original image is saved in the copy image. The copy image is the one saved in the collection file (see Jpeg stream below). |
| Caption | WSTR | This optional stream contains the media object's caption. |
| SourceFilename | WSTR | This optional stream contains the media object's source (original) file name. This field is absent when the media object was not created by opening a file (e.g., see IMSHIPicture::OpenFromDib). |
| SourceFileInfo | BY_HANDLE_FILE_INFORMATION | This stream contains the file information associated with the media object's source file (if any). It is used to determine if the source file is changed after being loaded into the collection. |
| DontUseOriginal | long | This stream contains a flag indicating if the original file should be used when trying to access the full picture (e.g., see get_FullImage). |
| Jpeg | Byte stream containing a Jpeg compressed image | This stream contains the copy image, as a Jpeg-compressed image. This image is initially the original image compressed to 120 KB or smaller. The first time image is cropped, if original image is still available, the cropped copy of the original is recompressed to 120 KB or smaller and saved as the copy image. Any cropping done when the original is not available do not affect this copy image. |

At a step 88, the photo viewer determines whether the original image is less than 200 kilobytes in size or whether the original image is in a format other than JPEG. If the original image is larger than 200 kilobytes or is in a format other than JPEG, the photo viewer compresses the original image with a JPEG engine to create a copy image. A copy image does not replace the original image; instead, the copy image is simply used for display purposes when the user is working with the collection. The copy image may also be used as a surrogate or backup for the original image if the original image is lost. At a step 90, the photo viewer stores the copy image as a stream of data in the substorage of the OLE document file for the collection on memory media, such as a hard drive or a floppy disk. However, if the original image is less than 200 kilobytes and is in the JPEG format, the photo viewer stores the original image as the stream of data.

At a step 92, the photo viewer shrinks the original or copy image down to a thumbnail, preferably using a graphics device interface (GDI), such as STRETCHBLT. The photo viewer then displays the thumbnail in the collection user interface at a step 94.

At a decision step 96, the photo viewer determines whether the user has chosen to add another image, and if so, control returns to step 82, to obtain another original image. If the user chooses not to add another image, the photo viewer awaits further input from the user and subsequently performs further processing of the collection at a step 98. For example, the user may enter a title for the collection or may modify one of the images in the collection. Details of step applied in one form of modifying an image are described below.

Figure 4:
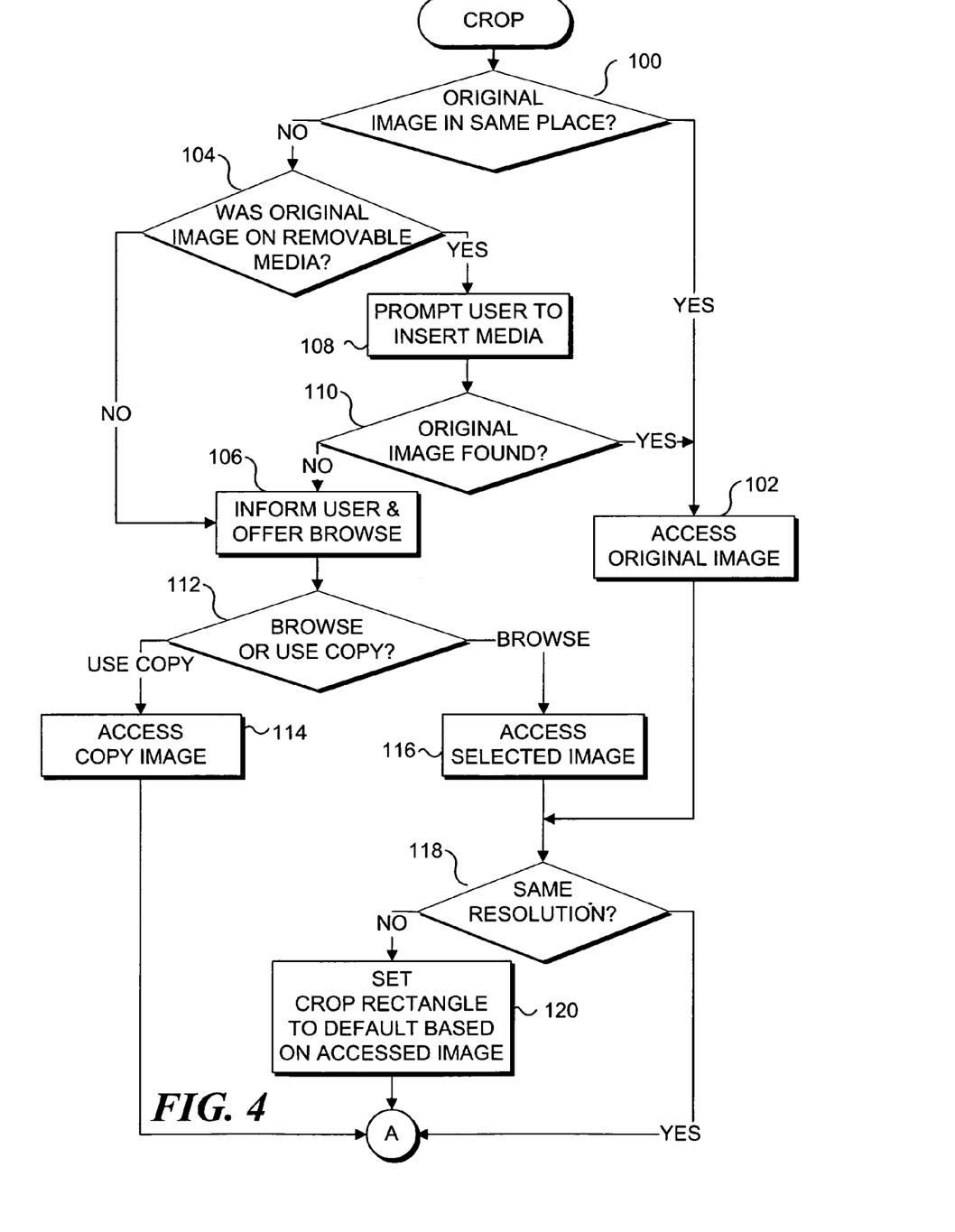
FIG. 4 is a flow chart illustrating logic to obtain an image that the user wishes to crop.

FIG. 4 is a flow chart illustrating logic relating to cropping an image. At a decision step 100, the photo viewer determines whether the original image selected by the user for cropping is still stored in the same location as it was when the image was first added to the collection. The photo viewer uses metadata in the substorage that indicates the location of the original image when it was first added to the collection. Between the time that the original image was first added to the collection and the time that the user chooses to crop the image, the user may have moved the original image, renamed it, or deleted it. The photo viewer attempts to validate the availability of the original image for purposes of modifying the image, to ensure that the highest quality data are used for the representation that is to be edited by the user. If the data defining the original image are in the same location, the photo viewer accesses the data for the original image at a step 102.

However, if the data for original image location are no longer at the location where previously stored, the photo viewer attempts to find the data for the original image with the user's assistance. At a decision step 104, the photo viewer determines whether the original image was obtained from a removable media that is no longer in the appropriate device. If the original image was not on a removable media, the photo viewer informs the user, at a step 106, that the original image is no longer available at its original location and offers the user the chance to browse storage to find the data for the original image. If, however, the original image was on a removable media, the photo viewer prompts the user to reinsert the removable media at a step 108. The photo viewer then determines at a decision step 110, whether the data for original image are on the removable media inserted by the user. If the data for the original image are found on the removable media, the photo viewer accesses the data for the original image at step 102.

At a decision step 112, the photo viewer determines whether the user has elected to browse the storage to find the data for the original image or instead, to use the copy image stored in the collection at the time the image was first added to the collection. If the user chooses to use the copy image, the photo viewer accesses the copy image at a step 114. Note that the copy image may actually be the original image, if the original image was less than 200 kilobytes and was in the JPEG format. Also, even if the copy image that is employed is the compressed version of the original, use of the compressed copy image to carry out an editing modification does not necessarily mean that the original image can no longer be used for subsequent modifications. For example, the removable media containing the original image might be temporarily unavailable when the user wants to perform the crop operation. The user can still crop the copy image, but the photo viewer retains the metadata defining the location of the original image. When the removable media with the data for the original image later become available, the crop metadata can then be used with the data for the original image to perform subsequent modification or editing of the image. For example, if the user wants to store the cropped image on a floppy disk, the data for the original image and the metadata defining the size and location of a crop outline that identifies the portion of the original image comprising the cropped image will be stored onto the floppy disk. Thus, the best quality image data (i.e., for the original image) will be utilized if available, but if not, the user is not precluded from performing editing operations using the copy image instead.

If the user prefers to browse for the original image data file (or even an alternative image data file), the photo viewer accesses the image data file selected by the user at a step 116. To ensure that the selected image data or data for the original image can apply the metadata defining the previous crop editing modification, the photo viewer determines, at a decision step 118, whether the accessed image has the same resolution as the original image when the original image was first added to the collection. For example, the original image may have been modified by the user with another software image editing application, such that the original image no longer has the same resolution as it did when first added to the collection. If the accessed image does not have the same resolution, the photo viewer sets the crop outline limits defined in metadata (i.e., CropRect) to default values based on the characteristics of the accessed image, at a step 120. Otherwise, the photo viewer can continue to use the existing metadata that define the outline of the cropped image on the representation of the original image displayed to the user.

Figure 5:
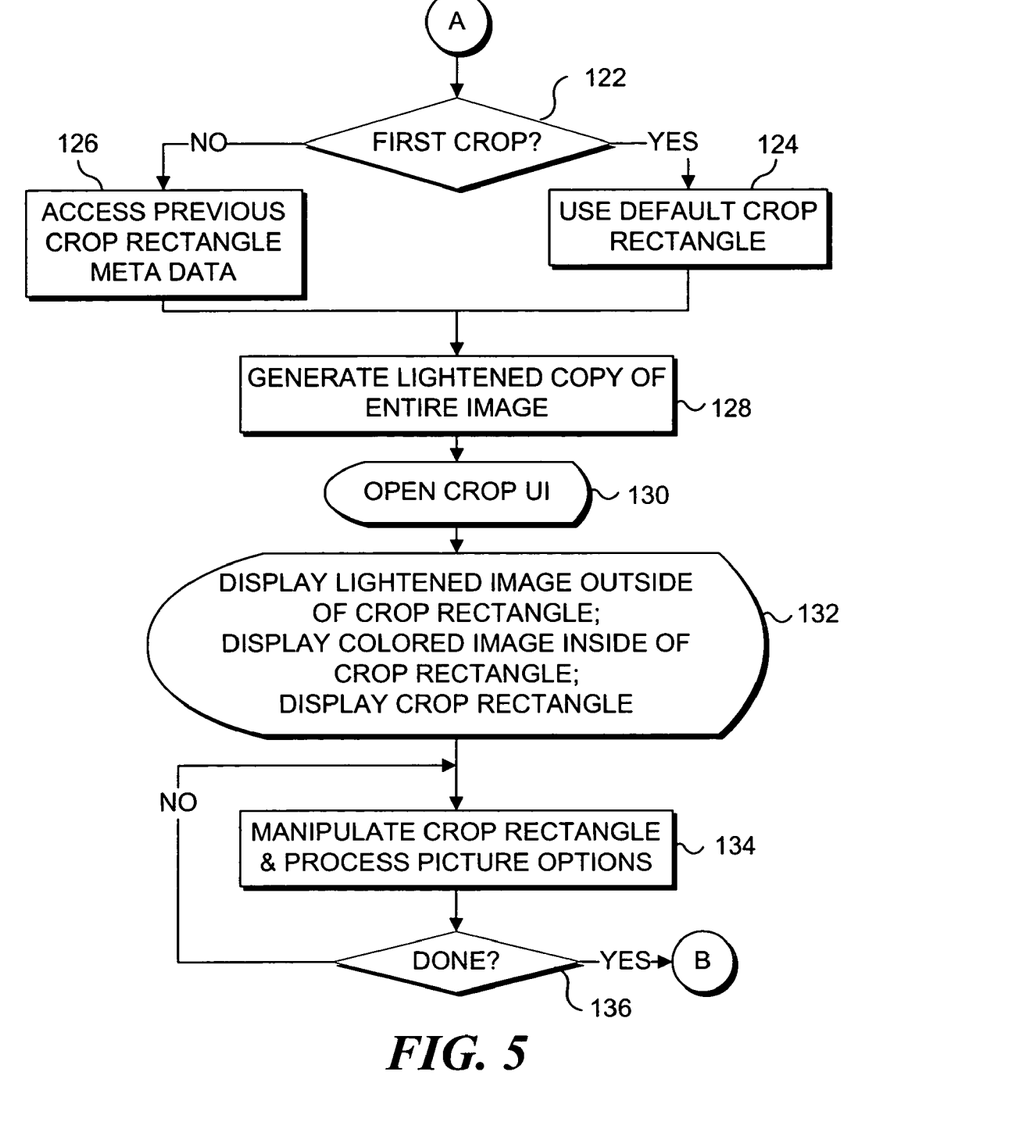
FIG. 5 is a flow chart illustrating logic for displaying an image to be cropped without loss of the data defining the image.

FIG. 5 is a flow chart illustrating logic for displaying an image to be cropped. At a decision step 122, the photo viewer determines whether the crop editing operation is being performed on the accessed image for the first time, or whether the representation of the image was previously cropped. If the crop editing operation is the first cropping to be performed on the image, in a step 124, the photo viewer uses a default crop outline that corresponds to a 4:3 aspect ratio relative to the dimensions of the accessed image. A 4:3 aspect ratio is used as a default in this embodiment, because an exemplary preferred embodiment of the present invention is embodied in a photo viewer application that is intended to display images on a standard television screen, which has this aspect ratio. If the crop editing operation was previously performed, the photo viewer accesses the previous crop outline rectangular size and position as defined in the metadata, at a step 126. Metadata defining the dimensions of the crop outline are employed for each crop editing operation. For subsequent crop editing operations, the photo viewer preferably employs the previously stored metadata to display the cropped image, if different than the default crop outline.

At a step 128, the photo viewer generates a lightened copy of the entire accessed image. A lightened image may be generated in a number of ways. However, in this embodiment, each pixel color value is preferably lightened by applying a scaling factor that significantly modifies the appearance of the image. For example, each Red, Green, and Blue (RGB) component of a color value (on a scale of 0–255) for each pixel is divided by two and added to 127.5, which is one-half of 255. An integer version and a percentage version of the above computation are also contemplated. This computation scales the color value to lighten the image or modify its contrast. An alternative approach simply reduces an alpha factor applied to each pixel rather than lightening each color value; however, the above computation is more broadly applicable, because some images may not include an alpha factor value. At a step 130, the photo viewer opens and displays a crop user interface. With this interface, a user selects the portion of the image that is to be cropped, i.e., within a crop outline that is typically a rectangle. At a step 132, the photo viewer then displays the lightened image outside the crop outline determined above and displays the full colored image inside the crop outline. The photo viewer also displays the crop outline itself. Thus, the user can visually perceive the portion of the image that will be cropped (i.e., the outer lightened portion) relative to the portion that will remain included within the cropped image (i.e., the inside full colored portion).

At a step 134, the photo viewer enables a user to manipulate the crop outline to change the desired crop area, shape, and location, and enables the user to select additional picture options as discussed in further detail below. At a decision step 136, the photo viewer determines whether the user has elected to end the crop editing operation. If not, control returns to step 134 to enable the user to make further modification of the crop outline and select other processing options. However, once the user is done manipulating the crop outline and selecting other options, control passes to logic described in FIG. 7.

Figure 6:
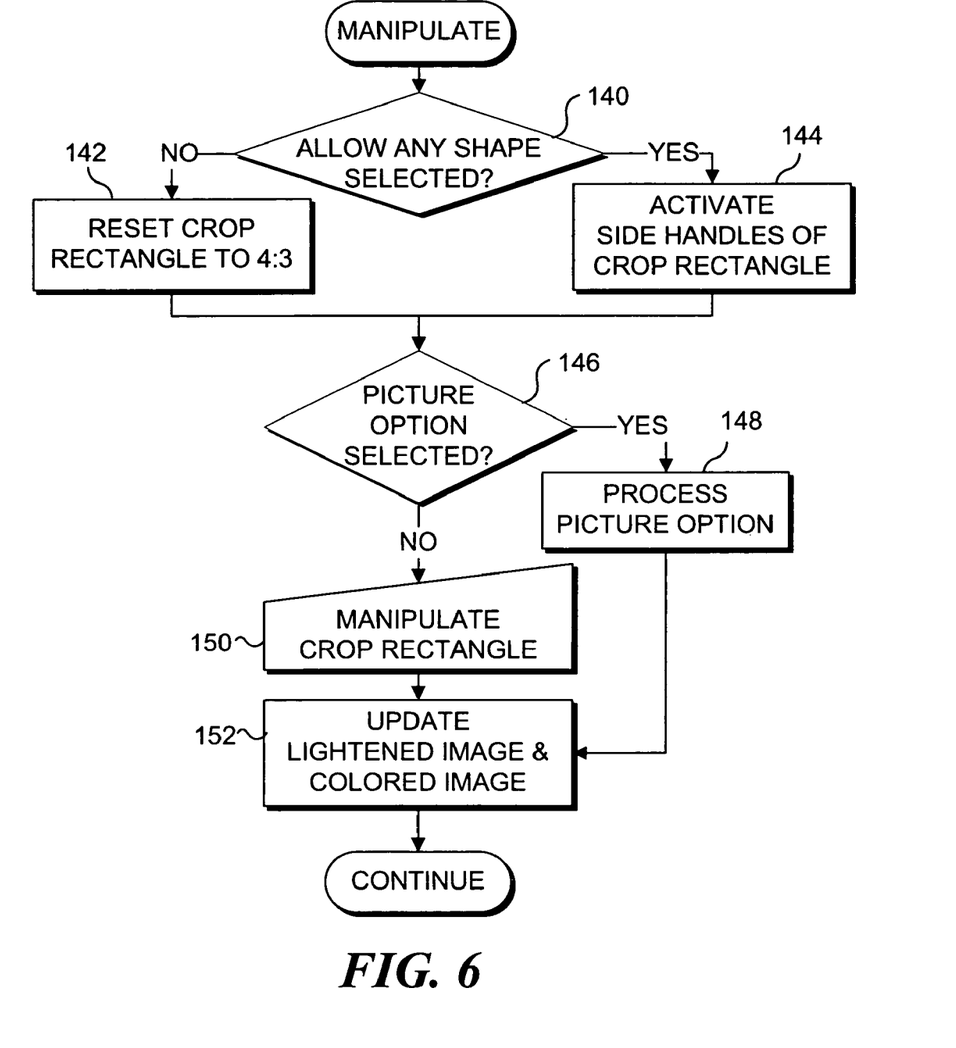
FIG. 6 is a flow chart illustrating logic for manipulating a crop outline and processing user options.

FIG. 6 is a flow chart illustrating logic for manipulating a crop outline and processing picture options and corresponds to step 134 of FIG. 5. At a decision step 140 of FIG. 6, the photo viewer determines whether the user has chosen to allow any shape to be used for the crop outline, so that the cropped image is not limited to a 4:3 aspect ratio. If so, the photo viewer activates side manipulation handles of the crop outline at a step 144. The crop outline also includes corner handles that enable the user to modify the crop outline in a way that maintains a fixed aspect ratio. However, side handles enable the user to manipulate a single side of the crop outline so that a fixed aspect ratio is not maintained. It is contemplated that the crop outline may also be a free-form outline that can allow for cropping any shape. If the user has instead chosen the option to apply an aspect ratio of 4:3, the side manipulation handles are not displayed and the crop outline will be locked in the 4:3 aspect ratio, at a step 142. The aspect ratio is set to this default value for a first crop operation, or is reset to this aspect ratio when the user chooses not to allow any shape for the crop outline.

At a decision step 146, the photo viewer determines whether the viewer has selected another editing option, such as previewing the cropped image determined by the current crop outline, in a separate window. Other options include restoring the crop outline to the full size of the entire image. If the user chooses to process an option, the photo viewer processes the selected option at a step 148. If the user does not choose to process any options, the user may manipulate a crop outline at a step 150. As indicated above, the crop outline includes handles at least at the four corners of the crop outline, and at the sides of the crop outline if any shape is allowed. The handles enable the user to change the size (and the shape—if side manipulation handles are provided) of the crop outline with a pointing device. In response to any change of the crop outline, the photo viewer updates the lightened image that is outside the limits of the crop outline and the normally colored cropped image that is inside the limits of the crop outline, at a step 152. The updated image that is displayed can also be affected by the options selected by the user.

Figure 7:
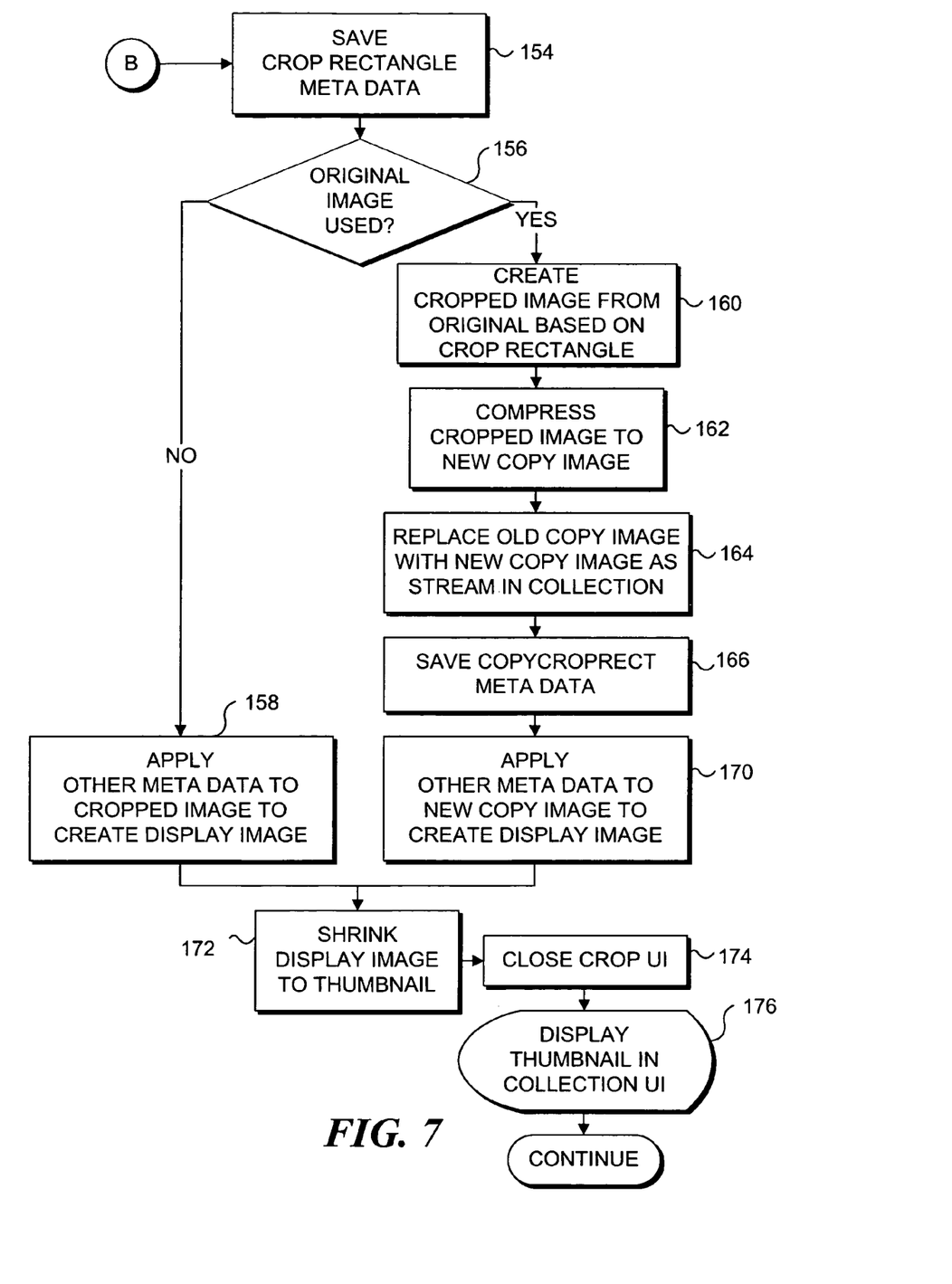
FIG. 7 is a flow chart illustrating logic for completing a crop operation.

FIG. 7 is a flow chart illustrating logic for completing a crop editing operation. At a step 154, the photo viewer saves the crop outline dimensions and location as metadata in the substorage (i.e., CropRect). At a decision step 156, the photo viewer determines whether the data for the original image was used during the crop operation. If the original image was used for cropping, the photo viewer creates a cropped image from the original image, at a step 160, based on the crop outline. At a step 162, the photo viewer compresses the new cropped image to create a new copy image. It must be emphasized that although this preferred embodiment creates a copy image, in the embodiment's broader context, the present invention does not require that a copy image be created or stored. As indicated above, a copy image is used for display purposes and as a surrogate backup for the original image. It is considered beneficial to create a new copy image based on the cropping, because the copy image will then be a higher resolution copy image in the cropped area than the first copy image. More data is concentrated from the cropped area of the original image into the second copy image, so that this second copy image has a higher resolution of that cropped area. At a step 164, the photo viewer replaces the old copy image with the newly created copy image as a stream in the substorage of the image object in the collection.

At a step 166, the photo viewer then saves metadata referred to as "CopyCropRect" in Table 2 above. CopyCropRect identifies the size and location of the new copy image that is saved, relative to the original image. The size and location of the new copy image correspond to the cropped image defined by the crop outline as last modified using the original image data. Thus, the CopyCropRect metadata defines the portion of the original image that is saved as the current copy image, as determined by the last modification made during the cropping operation. Because the cropping was done using the original image data, CopyCropRect is identical to CropRect which defines the cropping outline, and is used to create the display of the cropped image. The benefit of the CopyCropRect metadata is explained below with respect to the case when the original image is not used for the cropping operation.

At a step 170, a photo viewer then applies any other metadata to the new copy image to create the display image. As above, the other metadata includes a caption, an image number, a rotation, a scale factor, and other image object parameters.

If the original image was not utilized, the photo viewer simply applies any other metadata to the cropped image, at a step 158, to create a display image. Again, other metadata include a caption, an image number, a rotation, a scale factor, and/or other image object parameters.

There are two scenarios that must be considered at this point, although the logic of FIG. 7 remains the same for both scenarios. The first scenario is as described above, wherein the first copy image was not previously cropped and thus is a representation of the entire original image (or is a copy of the actual original image) when the image was added to the collection. A first cropping operation would utilize the first copy image (when the original image is not available). When the first cropping operation was complete, the photo view would save the CropRect metadata. However, the photo viewer would not crop and compress the copy image as the photo viewer does when the original image is used. Whenever the original image data is not available, the photo viewer assumes that the original image data is lost and that the copy image is the only data left regarding the original image. So as to retain as much data as possible, the photo viewer retains the complete copy image in the substorage. When the cropping operation is completed, the photo viewer simply saves the updated crop outline metadata (i.e., CropRect) at step 154 and applies the other metadata at step 158.

The second scenario considers a second cropping operation, wherein the copy image represents an already cropped image that was created from the original image (steps 160–164), but wherein the original image is no longer available for the second cropping operation. In this case, the dimensions of the copy image were stored as the CopyCropRect metadata during the first cropping operation (step 166). If the user then carries out a second cropping operation on the copy image (when the original image is no longer available), again the photo viewer retains the complete copy image so as to retain as much data as possible. However, now the CopyCropRect metadata defines the extent of the known copy image, as it was first cropped. The CropRect metadata defining the crop outline for the second cropping operation will now be different from the CopyCropRect metadata. Accordingly, if a third cropping operation is implemented using the copy image, the user will be able to modify the crop outline limits to the extent of the copy image resulting from the first cropping operation, since the copy image data remain unmodified by the second cropping operation. In effect, the copy image becomes the surrogate original image. As indicated above, the retention of the copy image data is important, since it retains the best data available for subsequent editing operations (since the original image data were not available for the subsequent cropping operations). It should also be noted that if a subsequent (i.e., second, third, etc.) cropping operation is applied to the first cropped copy image, the user can only further reduce the size of the crop outline. After the first cropping operation, the copy image does not include any portion of the original image outside of the crop outline, so there is no way to expand beyond the limits of the first cropped copy image until the original image is available again. However, it is contemplated that the copy image from the original image could remain saved, rather than replacing the copy image at step 164.

In any case, at a step 172, the photo viewer shrinks the display image to a thumbnail. At a step 174, the photo viewer then closes the cropping user interface. Finally, the photo viewer displays the thumbnail of the newly cropped image in the collection user interface at a step 176.

Figure 8:
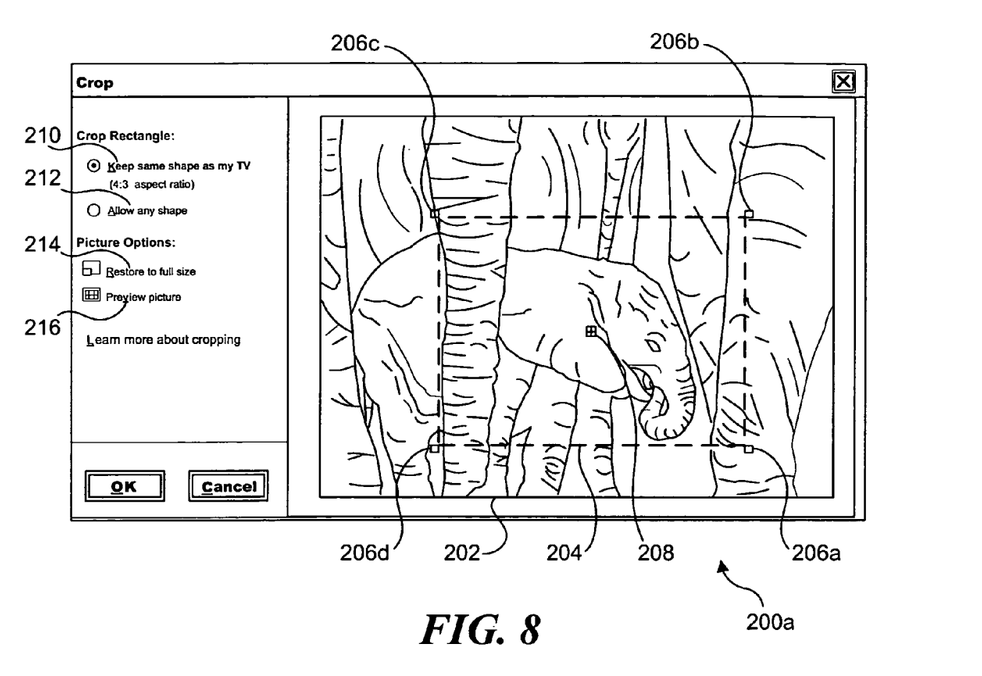
FIG. 8 illustrates the layout of an image cropping user interface.

FIG. 8 illustrates the layout of a "crop user interface" 200a. Displayed in one portion of crop user interface 200a is an image 202. Displayed over image 202 is a crop outline 204. As discussed above, the image is lightened outside of crop outline 204 and appears normal inside crop outline 204. Crop outline 204 includes handles 206a through 206d. A user may manipulate the dimensions of crop outline 204 by dragging the handles with a pointing device, such as a mouse. A center handle 208 also enables the user to move the entire crop outline to a different location over image 202.

The aspect ratio of crop outline 204 remains fixed at 4:3 while a fixed aspect ratio option 210 is selected. As indicated above, fixed aspect ratio option 210 is provided to enable the images to correspond to a standard television screen aspect ratio. Alternatively, the user may choose to allow any shape for crop outline 204 by choosing variable aspect ratio option 212.

Also as described above, the user may select options to change the visualization of an image. For example, the user may selectively view the entire image 202 in its normal color, by choosing full size option 214. Full size option 214 expands crop outline 204 to the full extent of image 202, thereby eliminating any lightened area of image 202. Alternatively, the user may selectively preview only the portion of image 202 that is contained within crop outline 204 by choosing a preview option 216. Choosing preview option 216 causes a separate preview window (not shown) to appear on the display with only the cropped image visible within the preview window.

Figure 9:
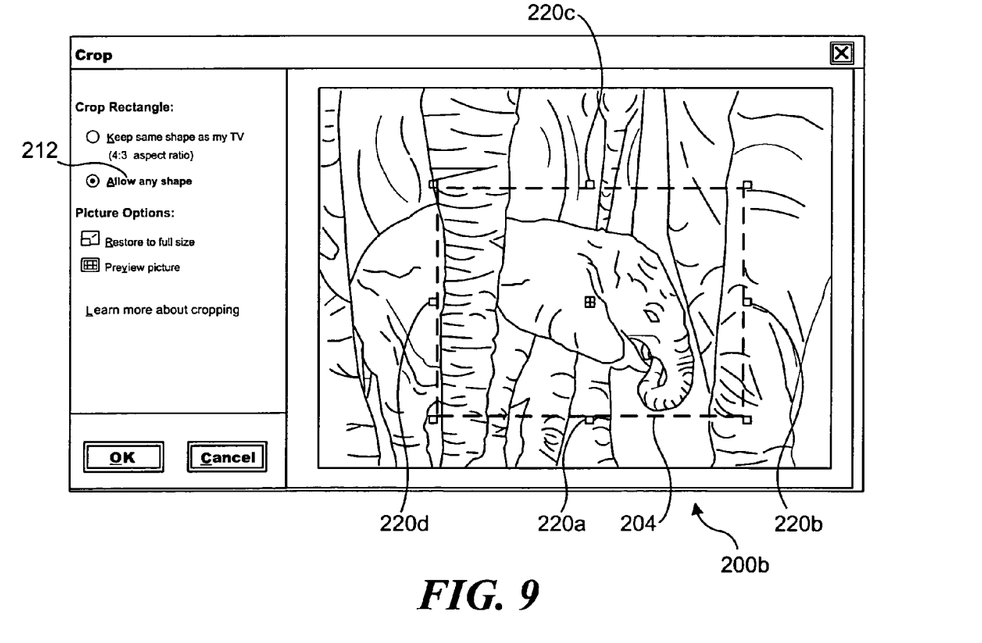
FIG. 9 illustrates an image cropping user interface with a variable size crop outline.

FIG. 9 illustrates a crop user interface with a variable size crop outline. Specifically, crop user interface 200b includes crop outline 204 with additional side manipulation handles 220a–220d. These additional side manipulation handles enable the user to modify a single-dimension of crop outline 204, causing a change in the shape or aspect ratio of crop outline 204. These side handles are only available when variable aspect ratio option 212 is selected.

Figure 10:
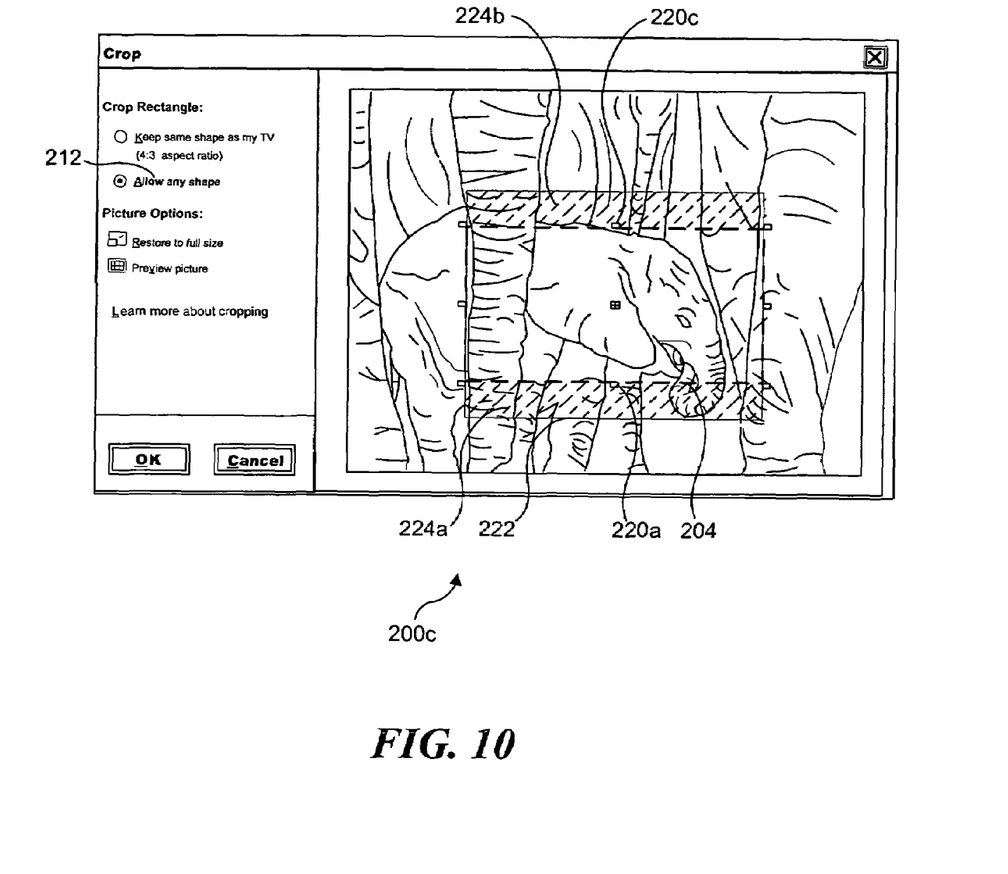
FIG. 10 illustrates the image cropping user interface with an optional feature.

FIG. 10 illustrates the crop user interface with an optional television visualization feature. Specifically, crop user interface 200c indicates that variable crop outline option 212 has been selected and crop outline 204 has been modified in the vertical direction with side handles 220a and 220c. However, an optional aspect ratio rectangle 222 displays the standard television aspect ratio (4:3) to show how the cropped image will appear on a television set. For example, optional aspect ratio rectangle 222 shows that dark band areas 224a and 224b will appear on the top and bottom portions of a standard television display screen based on the current dimensions of crop outline 204.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for lossless editing of a media object, comprising the steps of:
   (a) accessing data defining the media object to produce a representation of the media object;
   (b) enabling a user to selectively edit the representation of the media object by applying a modification to the representation, initially producing metadata that define the modification;
   (c) rendering a modified media object in accord with the modification to the representation; and
   (d) storing the metadata initially produced to define the modification by the user that was applied to the representation, in association with the media object, without modifying the data that define the media object.

2. The method of claim 1, wherein the media object comprises an image, and wherein the modification comprises the step of cropping the representation of the media object, said metadata defining a size and a position of a crop outline on the representation of the image to indicate limits of a cropped image.

3. The method of claim 2, further comprising the steps of:
   (a) enabling the user to again selectively edit the representation of the media object, by applying a further modification that changes the limits of the cropped image on the representation of the media object;
   (b) updating the metadata to define the modification by indicating new limits of the cropped image; and
   (c) rendering the modified media object in accord with the further modification.

4. The method of claim 2, wherein the image is stored in a Joint Photographic Experts Group (JPEG) format.

5. The method of claim 1, wherein the step of storing the metadata comprises the step of storing a stream of the metadata in a substorage of an object linking and embedding (OLE) file.

6. The method of claim 2, wherein the step of rendering comprises the step of rendering the cropped image without portions of the representation that lie outside the limits of the cropped image and compressing data for a portion of the media object within the limits of the cropped image.

7. The method of claim 2, further comprising the step of storing the cropped image as a JPEG stream of data in a substorage of an OLE file, wherein the OLE file defines a collection of one or more images.

8. The method of claim 2, further comprising the step of providing input to the metadata for storage that defines at least one of an image title, an image number, an image rotation, an image width, an image height, and an image source file location for the media object.

9. The method of claim 2, further comprising the step of perceptibly differentiating a first portion of the representation of the image from a second portion of the representation of the image, wherein the first portion and second portion are demarcated by the crop outline.

10. A machine-readable medium having machine instructions for performing the steps of claim 1.

11. A system for lossless editing of a media object, comprising:
 (a) a processor;
 (b) a display in communication with the processor;
 (c) an input device in communication with the processor; and
 (d) a memory in communication with the processor, said memory storing the media object and machine instructions that cause the processor to:
  (i) access data defining the media object, to produce a representation of the media object;
  (ii) enable a user to employ the input device to selectively edit the representation of the media object by applying a modification to the representation, initially producing metadata that define the modification by a user;
  (iii) render a modified media object in accord with the modification applied to the representation; and
  (iv) store the metadata initially produced to define the modification applied by a user to the representation in association with the media object, without modifying the data that define the media object.

12. The system of claim 11, wherein the media object comprises an image, and wherein a user is enabled to crop the representation of the media object, said metadata defining a size and a position of a crop outline on the representation of the image on the display, to indicate limits of a cropped image on the representation of the media object.

13. The system of claim 12, wherein the machine instructions further cause the processor to:
 (a) enable a user to employ the input device to again selectively edit the representation of the media object, by applying a further modification that changes the limits of the cropped image on the representation of the media object appearing on the display;
 (b) update the metadata to define the modification by indicating new limits of the, cropped image; and
 (c) render the modified media object on the display in accord with the further modification.

14. The system of claim 12, wherein the image is stored in the memory in a Joint Photographic Experts Group (JPEG) format.

15. The system of claim 12, wherein the metadata are stored in the memory as a stream of data in a substorage of an object linking and embedding (OLE) file.

16. The system of claim 12, wherein the machine instructions further cause the processor to render the cropped image without portions of the representation that lie outside the limits of the cropped image and compress data for a portion of the media object within the limits of the cropped image.

17. The system of claim 12, wherein the machine instructions further cause the processor to store the cropped image as a JPEG stream of data in a substorage of an OLE file, wherein the OLE file defines a collection of one or more images.

18. The system of claim 12, wherein the machine instructions further cause the processor to provide input to the metadata for storage in the memory, wherein said input defines at least one of an image title, an image number, an image rotation, an image width, an image height, and an image source file location for the media object in the memory.

19. The system of claim 12, wherein the machine instructions further cause the processor to perceptibly differentiate a first portion of the representation of the image from a second portion of the representation of the image, wherein the first portion and second portion are demarcated by the crop outline.

* * * * *